Sept. 20, 1971   C. R. CASSELL, SR   3,605,268
HUNTING KNIFE
Filed Oct. 25, 1968

INVENTOR
CLYDE R. CASSELL, SR.

ATTORNEYS
SCHELLIN & HOFFMAN

United States Patent Office 3,605,268
Patented Sept. 20, 1971

3,605,268
HUNTING KNIFE
Clyde R. Cassell, Sr., 205 Lionville Road,
Downington, Pa. 19335
Filed Oct. 25, 1968, Ser. No. 770,536
Int. Cl. B26b 29/02
U.S. Cl. 30—294                                        1 Claim

ABSTRACT OF THE DISCLOSURE

This specification discloses a knife intended primarily for use in the hunting of game and which comprises a handle, a hilt and a blade. The latter element is of steel and is defined by two edges, an inner edge and an outer edge, and which edges meet at a point. The inner edge includes a straight portion adjacent to the hilt and is formed with a notch that extends into the blade in the direction of the point. This notch leaves a straight heel portion extending to the hilt. The notch has a blunt point, a sharp under edge, a sharp round corner and an upper edge which is blunt.

---

The present invention relates to knives and is concerned primarily with a knife that is designed and constructed for use in all the operations attending the dressing of game at the site of the kill.

When game is slain, it is imperative that it be "gutted" that is the entrails removed immediately to preserve the meat in an edible condition. There is not sufficient time to drag the game to some place other than the site of the kill to perform these dressing operations. While diverse cutting strokes are included the dressing as an overall proposition, the invention is concerned primarily with the draw stroke that is made in the belly of the carcass and which forms the cut through which the entrails are removed. This invention is predicated on the desirability of forming this cut with a single stroke that does not require any other operation or use of the hand other than that making the stroke.

It will be understood that all cutting knives include a handle, a hilt and a blade and that the latter terminates in a point. To facilitate outlining the objects and advantages of this invention, the two edges of the blade are identified as the inner edge and the outer edge.

With the above conditions in mind, the invention has as an important object the provision of a hunting knife, of the type noted, in which both edges are generally straight in those portions adjacent to the hilt. From the end of the straight portion, the outer edge is convex to the point. The blade is formed with a notch that opens into the straight portion of the inner edge to leave a heel. This notch is angularly directed toward the point so that it might be said to open toward the hilt.

The notch aforesaid presents four structural elements, namely, a forward point, an under edge, a corner and an upper edge extending from the corner to the heel.

An important object is to provide in a knife of the type noted including the notch aforesaid a point that is blunt and an under edge that is sharp. With this arrangement, the dull point may be inserted beneath the hide of the game being dressed and a cutting stroke made with the sharp under edge effective to sever the hide. The dull point exerts a slight lifting or separating effect on the hide and at the same time avoids cutting of the entrails so that the latter may be removed "en masse" that is as a unit. Still another object is to provide a knife of the character indicated in which the upper edge of the notch is dull. This edge does not enter into the cutting of the belly slit and while it is not essential that it be dull it is preferred that it have this property to minimize danger to the user.

Yet another object is to provide a hunting knife of the kind described in which the under and upper edges of the notch meet at a rounded corner. This corner enters into the cutting of the belly slit and is therefore sharp.

The outer edge is sharp throughout its extent and that portion of the inner edge between the notch and the point may be either sharp or formed with teeth whereby it is constituted a hacksaw. It is evident that all of the sharp edges of the knife must be maintained in a sharp condition. Thus, a further object of the invention is to provide a whet stone which is susceptible of use to grind all the edges and which is particularly designed to sharpen the under edge and round corner of the notch. This end is achieved by providing a whet stone having diverging flat faces which meet a smaller rounded edge and are joined at their other edges by a larger rounded bend.

Various other more detailed objects and advantages of the invention such as arise in connection with carrying out the above noted ideas in a practical embodiment will in part become apparent and in part be hereinafter stated as the description of the invention proceeds.

Figure 1:
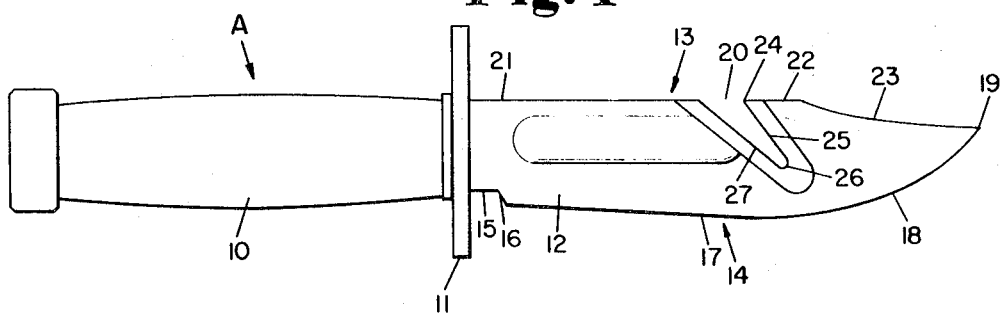
FIG. 1 is a view in elevation of a hunting knife embodying the precepts of this invention.
Figure 2:
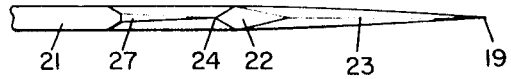
FIG. 2 is a top edge elevation taken on an enlarged scale looking directly into the notch that is a an angle of substantially 45° with respect to the straight edge portion of the blade.

Referring now to the drawings wherein like reference characters denote corresponding parts and first more particularly to FIGS. 1 and 2. A hunting knife embodying the present invention is therein illustrated and identified in its entirety by the reference character A. The knife A comprises a handle 10, a hilt 11 and a blande 12. The handle 10 and hilt 11 may be of any material conventionally employed for this purpose. The blade 12 is of a good grade of steel that is employed in cutlery. The blade 12 has an inner edge identified in its entirety by the reference character 13 and an outer edge designated generally 14. The latter includes a straight neck portion 15 which is connected by shoulder 16 with a generally straight portion 17 and a convex portion 18 extending between the straight portion 17 and a point 19. The portions 17 and 18 are sharp.

The inner edge 13 is straight throughout that portion of its extent immediately adjacent to the hilt and opening into this straight portion is a notch 20. This notch 20 leaves a heel 21 immediately adjacent to the hilt and a forward straight portion 22. A concave edge 23 extends between the straight portion 22 and the point 19. This edge 23 is sharp.

The notch 20 presents a forward corner 24 which is dull and an under edge 25 which is directed towards the point 19 and which is sharp. The under edge 25 terminates at a round corner 26 which is sharp and an upper edge 27 extends from the corner 26 to the heel 21.

While the edges 17, 18 and 23 are used in various dressing operations, the invention is concerned particularly with the formation of the belly slit to which the notch 20 is particularly related. In forming this belly slit, the point 24 is first inserted in a vent such as the anus of carcass to a position in which it underlies the skin. A pull is then exerted on the knife and this pull causes the point 24 to slightly lift or separate the skin from the carcass at the same time the latter is cut by the under edge 25 and the round corner 26. During this stroke the heel 21 performs a guiding function by being maintained in fairly close proximity to the outer surface of the hide.

Thus, the belly slit may be formed with a single stroke requiring the use of only that hand of the operator which grasps the handle. It is not necessary for him to use the other hand to raise the skin and separate it from the entrails. Also, the fact that the point 24 is dull ensures that the entrails will not be cut which would impair the ease of their removal.

Figure 3:
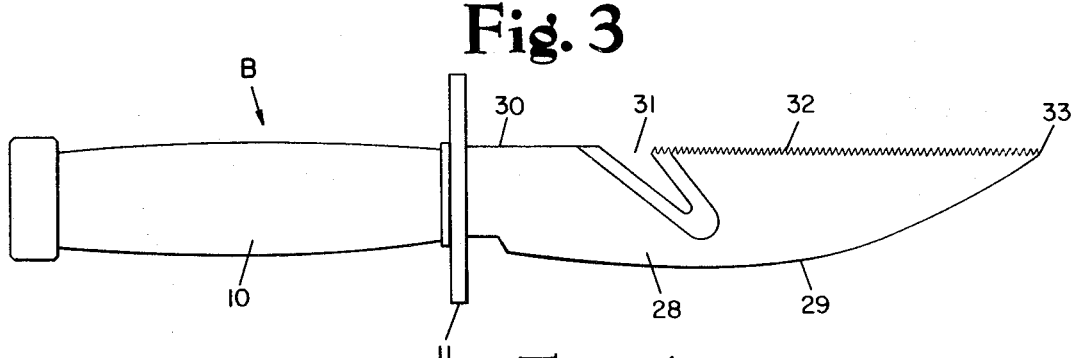
FIG. 3 is an elevation similar to FIG. 2 of a modified embodiment of the invention.
Figure 4:
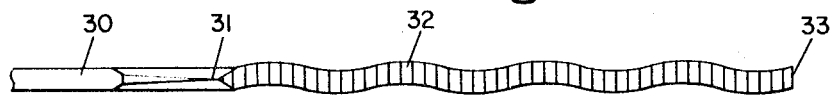
FIG. 4 is a top edge elevation of the blade from the notch outwardly taken on an enlarged scale.

Referring now more particularly to FIGS. 3 and 4, a modified form of hunting knife embodying the invention will be described. Thus, the knife B is shown as including the usual handle 10 and hilt 11. The blade 28 has an outer edge 29 including all the structural characteristics above described in connection with the outer edge 14 of knife A. The inner edge includes a heel 30, a notch 31 opening into the inner edge and a saw tooth edge 32 extending from the notch 31 to the point 33. The notch 31 is in all respects similar to the notch 20 of FIGS. 1 and 2. The knife B is used to cut a belly slit in exactly the same manner described above in connection with the knife of FIG. 1. The saw tooth edge 32 imparts utility for other operations.

Figure 5:
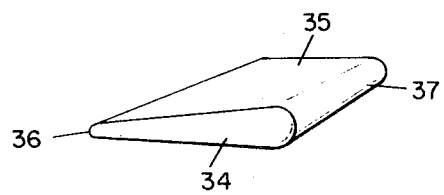
FIG. 5 is a perspective of the whetstone.

To sharpen the edges of either knife and particularly the underedge 25 and round corner 26 of the notch, the whetstone shown in FIG. 5 is provided. This whetsone comprises a bar like member 34 of an abrasive material conventionally employed in the production of a whetstone and which bar has opposed flat faces 35 in converging relation. The faces 35 are joined at the narrow side of the bar by round edge 36 and at the wider edge of the bar by a round bend 37. It is evident that this whetstone may be inserted in either of the notches 20 or 31 to grind either the under edge 25 or the round corner 26.

While preferred specific embodiments of the invention are hereinbefore set forth, it is to be clearly understood that the invention is not to be limited to the exact construction and designs illustrated and described because various modifications of these details may be provided in putting the invention into practice within the purview of the appended claim.

I claim:

1. A hunting knife for skinning and dressing game comprising:

(a) a handle (10),
(b) a hilt (11) and a blade (12) extending from the hilt,
(c) said blade being defined by an inner edge (13) and an outer edge (14) meeting at a point (19),
(d) said inner edge including a straight portion (21) immediately adjacent to the hilt,
(e) said straight portion having a notch (20) formed therein,
(f) said straight portion of the inner edge between the notch and the hilt serving as a guide heel,
(g) said notch extending toward the point and defining an under edge (25), an upper edge (27), a continuous round corner between said edges, and a forward point (24) at the outer end of said upper edge,
(h) the inner edge having a concave portion (23) between the straight portion thereof and the blade point whereby the forward point of the notch is raised above the point of the knife (FIG. 1),
(i) said forward point and said upper edge being blunt and said under edge and said round corner being sharp,
(j) said guide heel and the blunt edges of the forward point and upper edge being adapted to lift the skin of the animal to be skinned away from the carcass while the sharp edges of the notch cut through the skin.

References Cited
UNITED STATES PATENTS

| | | | |
|---|---|---|---|
| 912,146 | 2/1909 | Moffett | 30—353 |
| 1,843,223 | 2/1932 | Hasseler. | |
| 2,243,657 | 5/1941 | Tachi | 7—14.1 |
| 2,676,595 | 4/1954 | Dyekjaer | 128—305 |
| 3,241,236 | 3/1966 | Capps | 30—294X |

FOREIGN PATENTS

| | | | |
|---|---|---|---|
| 79,438 | 6/1955 | Denmark | 30—294 |
| 1,225,073 | 9/1966 | Germany | 30—294 |

ROBERT C. RIORDON, Primary Examiner

J. C. PETERS, Assistant Examiner

U.S. Cl. X.R.

30—144